Dec. 5, 1939.  J. S. STEWART  2,182,412
BULLDOZER
Filed April 28, 1937   5 Sheets-Sheet 1

Inventor.
James S. Stewart
Hazard and Miller
Attorneys.

Dec. 5, 1939.    J. S. STEWART    2,182,412
BULLDOZER
Filed April 28, 1937    5 Sheets-Sheet 2
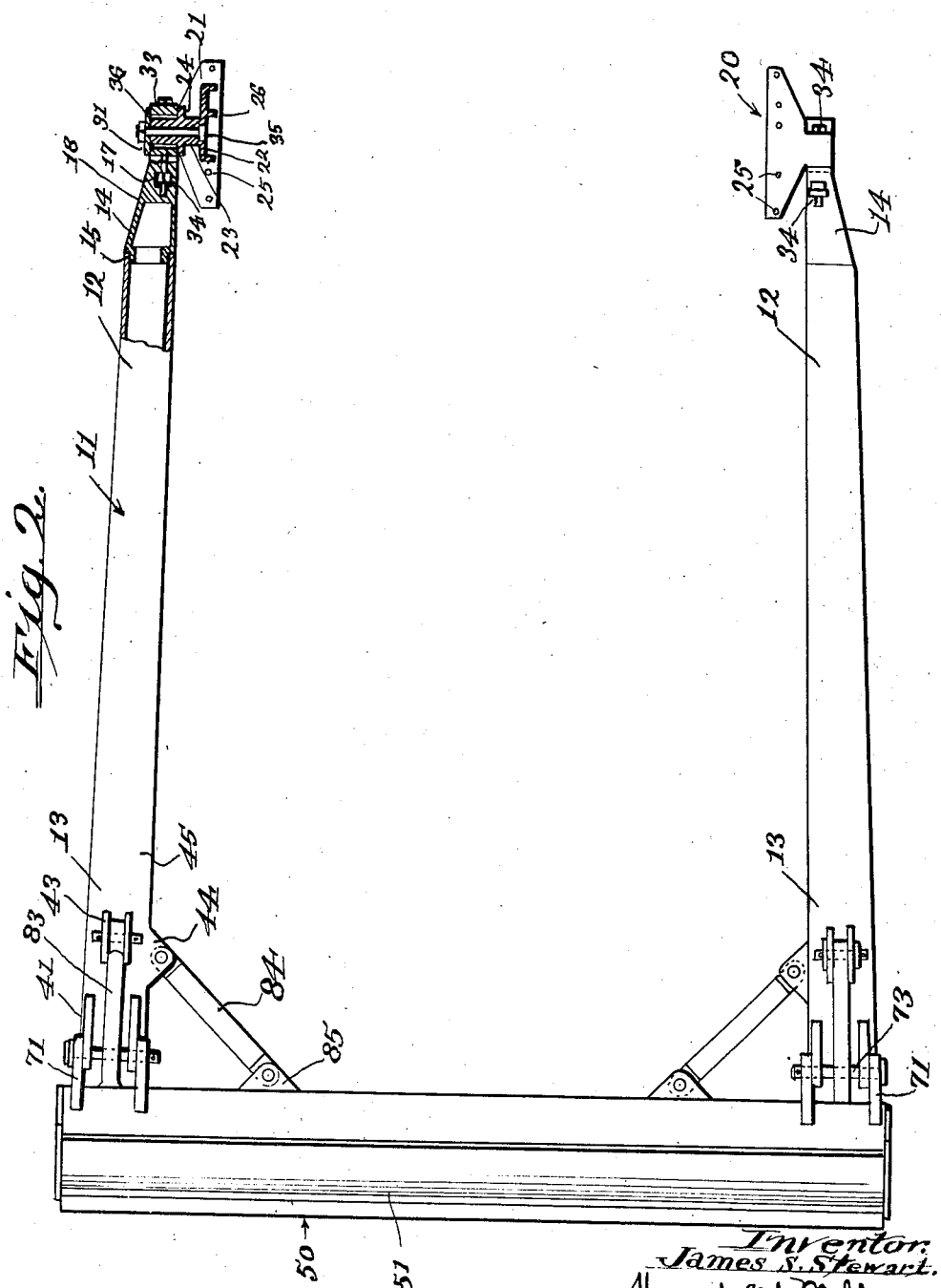
Inventor.
James S. Stewart.
by Hazard and Miller
Attorneys.

Dec. 5, 1939.  J. S. STEWART  2,182,412
BULLDOZER
Filed April 28, 1937   5 Sheets-Sheet 3
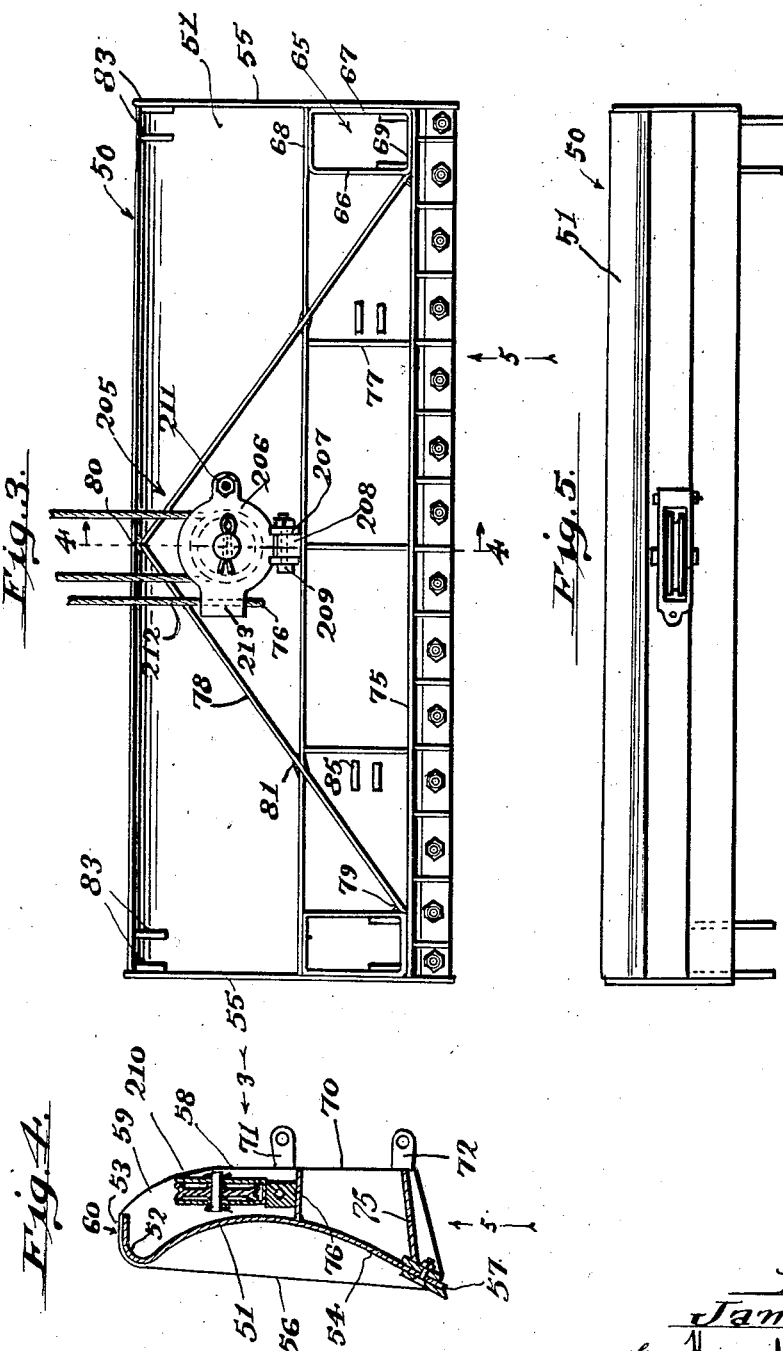
Inventor.
James S. Stewart
by Hazard and Miller
Attorneys.

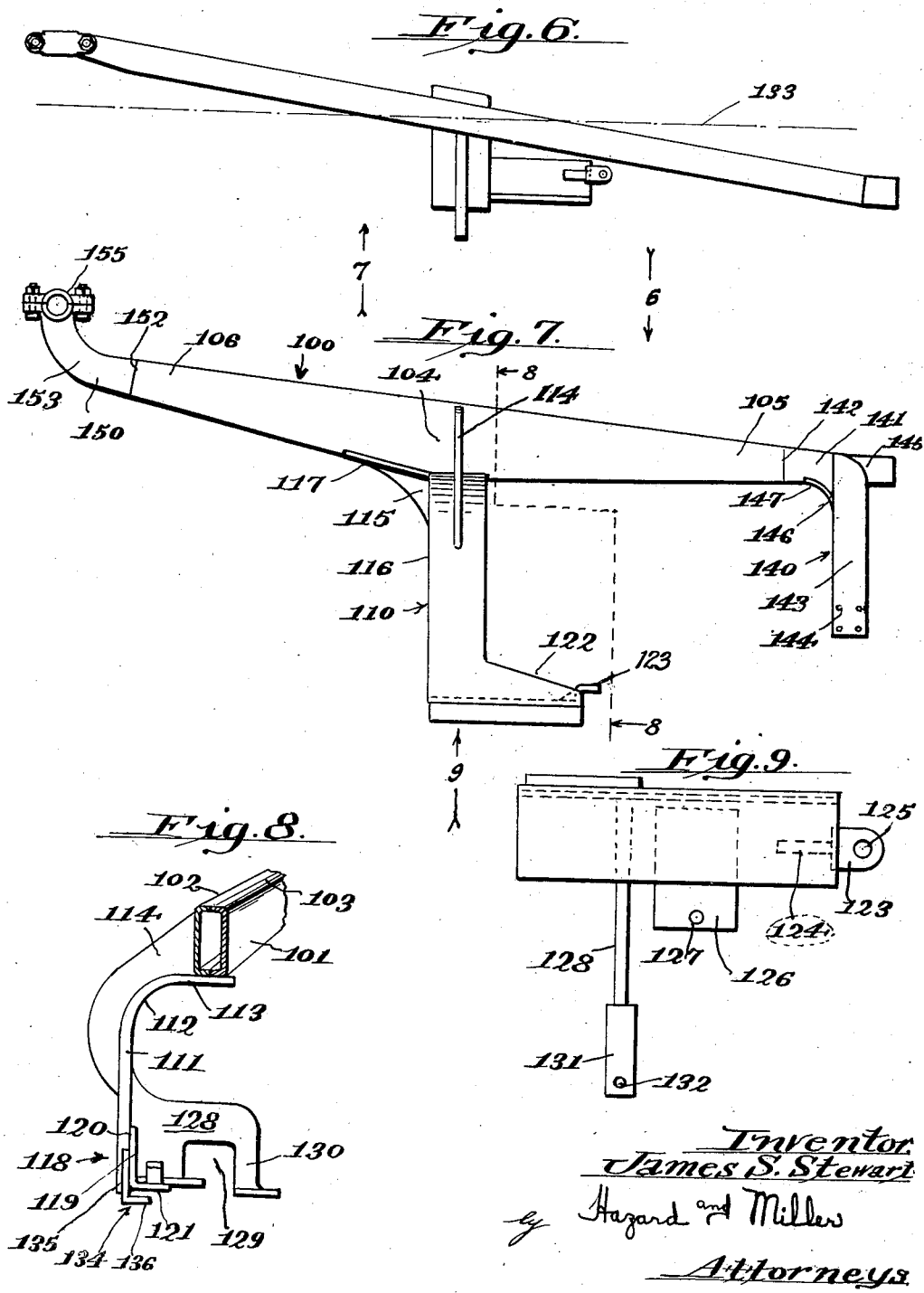

Dec. 5, 1939.   J. S. STEWART   2,182,412
BULLDOZER
Filed April 28, 1937    5 Sheets-Sheet 5
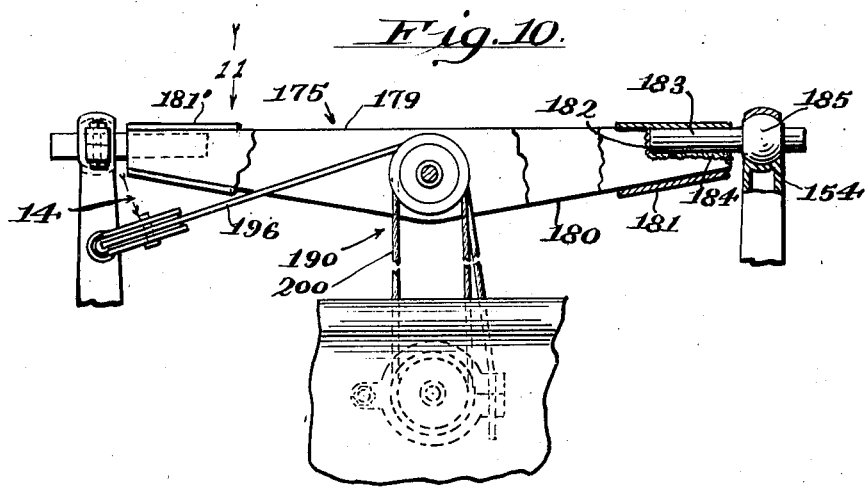
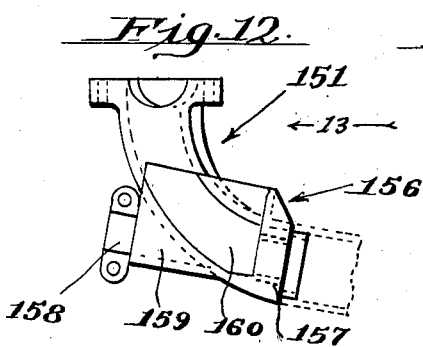  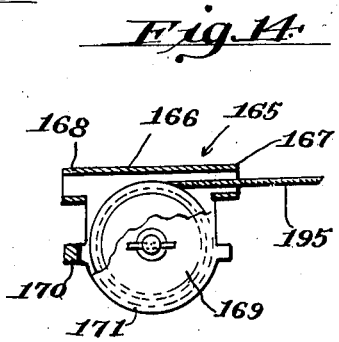
Inventor
James S. Stewart
By Hazard and Miller
Attorneys Patented Dec. 5, 1939

2,182,412

UNITED STATES PATENT OFFICE 2,182,412

BULLDOZER

James Samuel Stewart, Long Beach, Calif., assignor to Wayne D. Crook

Application April 28, 1937, Serial No. 139,500

8 Claims. (Cl. 37—144)

My invention relates to a bulldozer and is of a type usually used with an endless track type of tractor. Such type of tractors are generally required for heavy work to have sufficient weight and to give the necessary traction for bulldozing large and heavy masses of material. It is to be understood however, that my invention applies to wheeled type of tractors. With but slight modification my invention may be used with this latter type and designed for less heavy work.

One of the objects and features of my invention is the construction of the various parts of the bulldozer so that with but slight change these can be used with many different types of tractors, particularly of the endless track type. A characteristic of this type of tractor is that it has what might be termed a chassis frame on which is directly supported the engine, that is the power plant, the operator's seat and the various controls. A winch or cable drum is usually mounted at the rear end of this chassis frame back of the driver's seat and manipulated by a clutch. The winch is used for winding in and letting out the cable for lifting and lowering the bowl of the bulldozer and is also used for other work for which the tractor may be adapted. These tractors have an endless track frame which is usually connected to the chassis frame at the rear end without any spring connection or with very heavy rigid springs whereas the forward end of the endless track frame is connected to the chassis frame by a spring mounting, thus allowing either endless track at the forward end to climb over obstructions which may not be met by the opposite track. This action of one track climbing up on an obstruction or for instance the opposite side dropping into a depression, gives a lift or drop to the forward end of the endless track frame on one side as to its forward spring suspended portion without giving a material tilt to the chassis frame and the parts of the machine carried thereby.

Certain of the main characteristics of my invention relate to the construction and mounting of the side thrust arms to which the bowl is attached at the forward end in a rigid manner. My invention provides for a vertical adjustment of the trunnions at the rear end of the arms. Thus these trunnions may be given a relatively high or low position in reference to the endless track frame to which they are connected adjacent the rear portion of such frame.

Another characteristic and feature of my invention is in the mounting of the two side beams which extend longitudinally of the tractor above the upper run of the tread, these extending forwardly of the power plant and the chassis. Such beams are supported on two columns or posts. The main post is connected to the endless track frame adjacent the forward drive wheel of the endless track. This post takes the load and the tension at the rear end of the beam is carried by a rear post also connected to the endless track frame adjacent the rear driving wheel and in proximity to the trunnion connection of the thrust arms to such endless track frame. The side beams are thus of a cantilever type passing along and above the upper run of the endless track having the forward end as above mentioned extending in front of the chassis frame. A further characteristic of the position of support of the two side cantilever beams is that the vertical center of the thrust load, that is, of the forward thrust posts, is substantially over the center longitudinal line of the endless tracks. To obtain this construction these cantilever beams considered in plan converge from their rear tension support posts towards their forward ends located in front of the chassis frame and in front of the power plant. These beams therefore pass across the endless track on each side in a somewhat diagonal manner.

A further characteristic of my invention is mounting a substantial cross beam on the forward ends of the cantilever supporting beams. As this beam carries the sheaves over which operate the cable connected to the bowl, this beam is mounted in bearings to swivel on a horizontal transverse axis to accommodate the cables to the angle of lead to the bowl. Also to accommodate the difference of elevation of one cantilever beam to its mate on the opposite side when for instance the forward end of one of the tracks is either elevated or depressed in relation to the other track, I provide the cross shaft bearing in a ball or spherical bearing or bushing. This also is constructed to permit a slight change in length between the two bearings. This accommodates a tilt considered relative to the horizontal of the cross beam whereas the bowl may be horizontal when the rear end of a tractor is substantially horizontal.

One of the disadvantages of many of the present types of bulldozers mounted on endless track type of tractors is that the cable leads from the winch located at the rear end of the tractor is carried through a tube along one side of the tractor in a high position from the rear end to the forward end of one of the cantilever beams from which end the cables lead to the cross beam. As it sometimes happens that bulldozers of this type upset sidewise on their work, the operators have been frequently trapped or caught by this high cable lead in not being able to jump clear of the machine.

Therefore another feature of my invention is mounting the cantilever side beams in a relatively low position as to the endless track and chassis frame and having a sharply upturned neck at the forward end of each beam, the journals for the cross beam with the cable sheaves at the top of the upturned neck. One of these cantilever beams functions as a housing for the cable leads extending along one side of the machine from the winch to a guide sheave, which leads the cable to the sheaves on the cross beam.

My invention is illustrated in connection with the accompanying drawings, in which:

Fig. 2 is a plan partly broken away taken in the direction of the arrow 2 of Fig. 1 of the thrust arm and bowl construction illustrating the adjustable vertical attachment of the trunnion end.

Fig. 3 is a rear elevation of the bowl removed from the thrust arm and may be considered as taken in the direction of the arrow 3 of Fig. 1 or 4.

Fig. 4 is a vertical section of the bowl taken on the section line 4—4 of Fig. 3 in the direction of the arrows.

Fig. 5 is an underneath view of the bowl taken in the direction of the arrow 5 of Fig. 3 or 4.

Fig. 6 is a plan of one of the cantilever beams taken in the direction of the arrow 6 of Fig. 7.

Fig. 7 is an elevation of the beam of Fig. 6 taken in the direction of the arrow 7 of such figure.

Fig. 8 is a vertical transverse section on the line 8—8 of Fig. 7 in the direction of the arrows.

Fig. 9 is a bottom view taken in the direction of the arrow 9 of Fig. 7.

Fig. 10 is a front elevation of the swivel cross beam from which the bowl is suspended and may be considered as taken in the direction of the arrow 10 of Fig. 1 or 11.

Fig. 11 is a plan of the beam of Fig. 10 partly broken away taken in the direction of the arrow 11 of Fig. 10.

Fig. 12 is an elevation viewed from the inside of the upturned neck on the end of one of the cantilever beams used as a lead for the operating cable for the bowl, such elevation being taken substantially in the direction of the arrow 12 of Fig. 11.

Fig. 13 is an elevation of the neck taken in the direction of the arrow 13 of Fig. 12 removed from the end of the beam.

Fig. 14 is a plan of the sheave holder partly broken away and removed from the assembly and may be considered as taken in the direction of the arrow 14 of Fig. 10.

Figure 1:
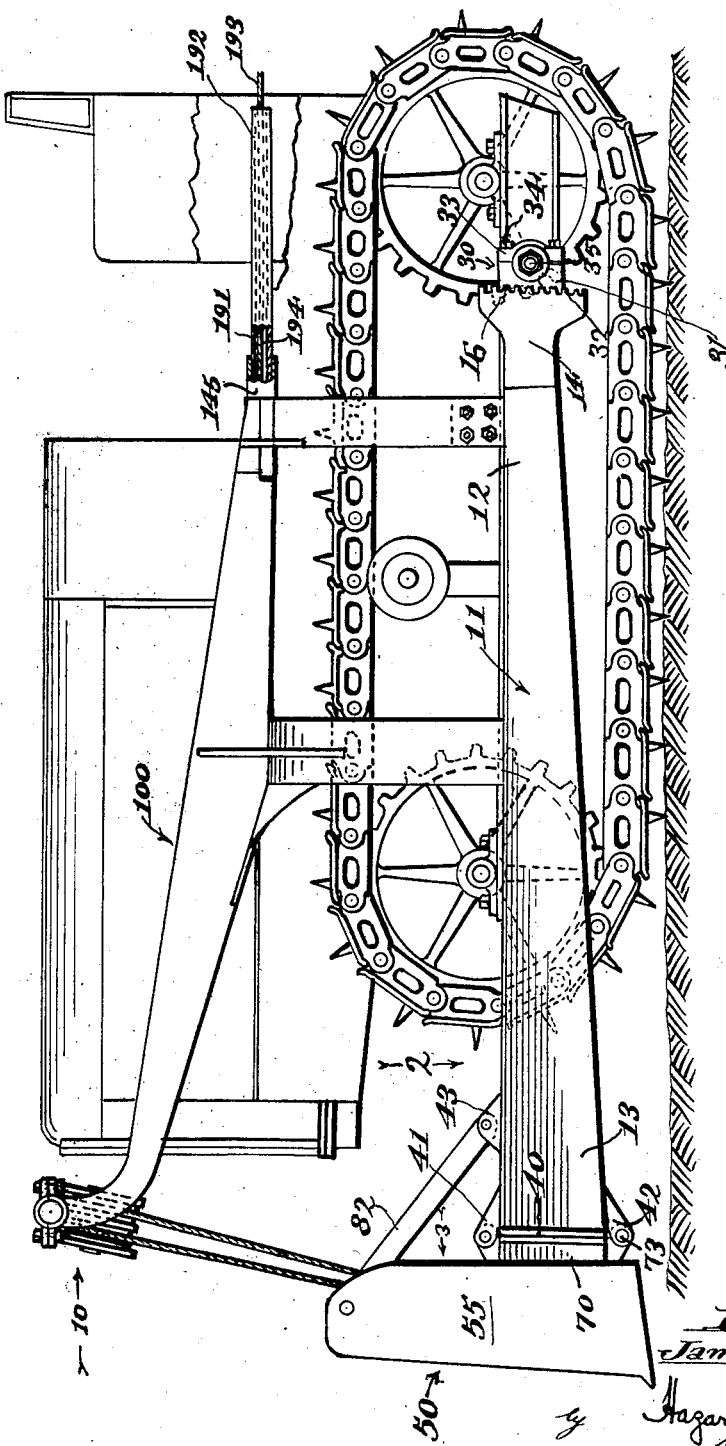
Fig. 1 shows a side elevation of my invention together with a side elevation of an endless track type of tractor to which it is connected.

Referring first to the construction shown in Fig. 1, my invention employs opposite side thrust arms designated by the assembly numeral 11. These are preferably formed hollow and substantially rectangular in cross section with a substantially uniform taper from the rear portion 12 to the front end portion 13. The rear end has attached thereto an abutment piece 14, (note Fig. 2) this being shown as having an internal neck 15 with a shoulder about the neck against which the small end 12 abuts and is secured by welding or the like. The abutment piece has adjusting vertical teeth 16 and back of such teeth there is a vertical shoulder slot 17 through preferably a solid portion 18. The trunnion assembly 20 is a casting having upper and lower plates 21 and a vertical connecting web 22 from which web there extends laterally a hub section 23 (note Fig. 2). This hub section has an inner flange 24. The upper and lower plates are spaced apart the proper distance so that the assembly may be secured to the frame of the endless track of the tractor by means of bolts passing through bolt holes 25. It will be noted that the web has small vertical ribs 26 engaging certain of these bolts. A terminal socket 30 has a front end 31 with teeth 32 to interlock with the teeth 16 on the end of the solid portion 18 of the abutment piece 14. A cap 33 fits on the front 31 and this whole assembly is secured by a pair of bolts 34 extending through bolt holes in the cap and the forward piece, these being threaded into a nut or the like in the shouldered vertical slot 17. A bolt 35 extends through the hub 23 with its head fitting in a socket on the inside and passes through a clamping plate 36, there being a nut on the outside. The terminal socket is thus mounted for a slight rotation on the hub 23 between the flange 24 and the plate 36. The vertical adjustment to the trunnion end of the arm 11 is done by loosening the bolts 34 and then re-adjusting the engagement of the teeth 16 and 32 respectively and again clamping these bolts. It will thus be seen that the rear end of the thrust arms may be adjusted vertically and that they also trunnion or have a slight swivel with the center of the hub 23 as the axis is swivelled.

The large or forward end 13 of the thrust arms has a contact end 40 to engage a complementary portion of the bowl hereinunder described and at the top and bottom is provided with complementary ears 41 and 42 (note Figs. 1 and 2). There is also a pair of spaced ears 43 on the top and spaced ears 44 secured to the inside surface 45 of each thrust arm, by inside surfaces is meant the portion which is contiguous to the tractor.

Referring to the construction of the bowl designated by the assembly numeral 50 (note particularly Figs. 1 through 5), this has a bowl plate 51 curved with a convex curve on the front side with a reverse bend 52 at the top and a horizontal top plate portion 53. The lower portion of the bowl plate 54 is substantially tangent to the curve of the upper part. At each side of the bowl there is a vertical side plate 55. This plate has a front edge 56 extending from substantially the reverse bend 52 at the top to the lower edge 57 of the tangential section 54 of the bowl plate. This side plate extends a considerable distance back of the bowl, being illustrated as having a rear edge 58 connected by a curve 59 to the upper edge 60 of such plate. These two opposite side plates are parallel and thus parallel to a second line through the tractor. A pair of rectangular thrust tubes 65 are constructed from the back of the bowl plate extending rearwardly, these having vertical side walls 66 and 67 and top and bottom walls 68 and 69 (note Fig. 3) terminating in an end edge 70 rearwardly of the rear edge 58 of the side plates 55. Each of these rectangular tubes is provided with upper and lower ears 71 and 72, these being inclined inwardly towards the axial center and they align with the ears 41 on the forward end of the thrust arms 11 so that attaching pins 73 may be driven through the eyes in these complementary ears, the pins preferably having a cotter pin manner of connection or bolts may be used. In this manner the bowl at its lower portion is firmly and rigidly secured to the ends of the two thrust arms.

The back of the bolt is reinforced by a lower somewhat horizontal plate 75 and an upper similar horizontal plate 76. These extend the full distance between the end plates 55 (note particularly Figs. 3, 4 and 5) and are secured by welding or the like to the top and bottom walls 69 of the short rectangular tube 65. A series of vertical webs 77 connect these plates. There is also a pair of diagonal brace plates 78 extending from one corner 79 of the square short tube 65 to their converging upper ends 80 underneath the horizontal section 53 of the bowl plate 51. At the intersections 81 with the horizontal upper reinforcing plate 76 there is a welded connection.

From the ears 43 there is a brace bar 82 extending upwardly to a pair of ears 83 on the back of the mold board of the bowl adjacent the top of the bowl. There is also a substantially horizontal brace bar 84 extending from the ears 44 on the thrust arm to a pair of ears 85 on the back of the mold board. These brace bars are connected to the respective ears by pins or bolts or the like. It will be seen by this construction that the bowl which has formed integral therewith the various brace plates may be disconnected from the forward end of the thrust arms 11 but when connected as above described, the thrust arms and the bowl form a rigid structure in which there can be no slip or pivoting movement.

The cantilever beam construction designated by the numeral 100 is shown particularly in Figs. 1, 6, 7, 8 and 9. These two beams are hollow in cross section and are formed from an inside and an outside channel 101 and 102 connected by central welds 103 extending lengthwise on the upper and lower surfaces (note Fig. 8). These cantilever beams have a thicker vertical end section 104 at the center, a reduced vertical end section 105 adjacent the tension support and also a reduced vertical section 106 at the cantilever end portion. The beams are of substantially constant width considered horizontally. The center thrust support or post designated 110 has a longitudinal web 111 which by means of a right angular bend 112 terminates in a horizontal section 113, this being welded to the underside of the thick center section 104 of the cantilever beam. A heavy outside rib 114 extends from the vertical section 113 and is welded to the outside face of the beam. The web at its top and forward edge has a somewhat triangular flared gusset plate 115 which is welded to the forward edge 116 of the web and at 117 to the underside of the cantilever beam. This gusset plate extends considerably forward of the web and thus gives additional strength to the cantilever end section of the beam.

The lower or foot portion designated 118 of the thrust support or post is constructed to conform to the particular tractor frame on which the support and the cantilever beam is mounted. An angle 119 is secured to the inside of the web 111. This angle may be considered as having a vertical flange 120 and a horizontal flange 121. The upper edge of the flange 120 is sloping as indicated at 122. At the rear end of the horizontal flange an angle boss 123 is secured by welding or the like, this having a gusset brace 124. The projecting portion has a bolt hole 125. A rectangular plate 126 is welded to the horizontal flange 121 projecting inwardly beyond the inner edge and this has a bolt hole 127. A heavy vertical web 128 is welded on the inside of the web 111 and to the vertical flange 120 of the angle 119 and also to the horizontal flange 121. This has a U shaped cut-out section 129 with a downwardly projecting spaced end 130 to which is welded a horizontal shoe 131 having a bolt hole 132. The characteristics of this construction of the thrust support is that the foot portion 118 may be secured to the tractor frame, that is, the portion of the frame carrying the endless tracks 10 so that the upper run of the track operates in the space below the horizontal section 113 and above the web 128. This causes the center line of the upper run of the endless track indicated at 133 to be directly in vertical alignment with the center or thrust support of the cantilever beam 100. For attachment to the frame of certain tractors, it is advisable to have a lower angle 134 which has a vertical web 135 welded both to the web 111 and to the vertical web 120 of the angle 119. This has a horizontal flange 136. The two angles 119 and 134 may be substantially the same length and between these is fitted a plate or angle element of the frame of the structure.

The tension support 140 (note Figs. 6 and 7) has an end cast piece 141 preferably tubular in cross section and welded at a socket joint 142 to the rear portion of the cantilever beam. This tapers and has a vertical strap 143 with bolt holes 144 for bolting to the frame of the tractor. It will be obvious that this tension end structure will be modified and changed to suit the particular tractor to which the assembly of the bulldozer is attached. One or both of the cast pieces 141 has a tubular socket end 145 forming an opening into the center of the beam for a cable guide as hereinunder detailed. Reinforcing fillets 146 and 147 strengthen the connection of the tension support to the rear end of the cantilever beam.

At the forward end of each cantilever beam there are neck pieces 150 and 151. The neck piece 150 is preferably of suitable casting secured to the forward end of one of the cantilever beams which is rectangular in cross section by a recessed welded section 152. This casting is preferably made rectangular in cross section and is bent upwardly with a sharp upward bend indicated at 153 (note Fig. 6) and has a spherical bearing 154 at its upper end (note Fig. 10), the bearing having a cap 155 clamped in position. The opposite neck piece 151 is shown particularly in Figs. 12 and 13. This is also provided with a sharp upturn similar to 153 and the same type of bearing but has a sheave journaling structure 156 formed integral with the casting. This has a rear bearing section 157 and a front bearing section 158 with a removable cap. This bearing structure is open on the inside as indicated at 159 and exposes the inside 160 of the lower portion of the neck. The purpose of this construction is for mounting a sheave swivel 165 (note Fig. 14). This is preferably made of a casting having a hub section 166 with a rear and a forward circular end 167 and 168. This casting is provided with two opposite plates 169 connected by straps 170 between which is fitted a sheave 171. This assembly is inserted in the sheave journaling structure shown in detail in Figs. 12 and 13 in which the rear end 167 fits in the rear bearing section 157. The opposite end 168 fits in the bearing end 158 and is held in the clamp. By removing the clamp the sheave swivel 165 may be inserted and clamped in place. This occupies the position shown in Fig. 10.

The swivel cross beam designated by the assembly 175 is shown particularly in Figs. 10 and 11 in which three vertical plates are used designated 176, 177 and 178. These have upper edges 179. Short rectangular plates 181 and 181' are fitted in the bottom edges 180 and the top edges 179 respectively adjacent the ends of the beam. The center plate 177 has a cut-out section 182 in which is fitted the inner end of a cylindrical shaft 183. This is welded to the cut-out section of plate 177 and also to the top plate 181' as indicated at 184. This makes a rigid and strong construction in which the shafts 183 may be considered as integral with the beam assembly 175. Slidably mounted on each shaft 183 is a ball 185, such ball being spherical on its outside surface is mounted in the bearing 154 and is held in place by the cap 155.

The cable connection from a winch usually positioned at the rear end of the tractor is defined by the cable assembly 190 (note particularly Figs. 1, 3, 4, 10, 11 and 14). Connected to the rear end of one of the cantilever beams, such being illustrated as on the right hand side of the tractor facing forwardly there is a guide tube 191 which is fitted in the tubular socket 145 secured to the rear end of the cantilever beam adjacent the tension support. This is secured by welding or the like. The rear portion 192 of the tube may be welded or otherwise fastened to the frame of the tractor and has an open rear end to receive the rear portion 193 of the cable 194. The rear end part leads to a winch mounted at the back of the tractor, such winch being not illustrated as it forms no part of my immediate invention. The cable leads upwardly on a slope through the inside of the cantilever beam 100 which is shown as being hollow and rectangular in cross section. A forward lead 195 enters the sheave swivel 165 through the rear end portion 167 and makes a right angle turn at the sheaves 171. A transverse lead 196 (note Fig. 10) leads to one of the idler sheaves of which there are two, 197 and 198 located between the center plate 177 and the outer plates 176 and 178 of the beam assembly. These sheaves are mounted on a short shaft 199 extending through the plates. From these sheaves on the swivel beam there are two drop leads 200 to the sheave assembly 205 (note Figs. 3 and 4) mounted on the back of the bowl. This assembly includes a sheave block 206 which has ears 207 connected to a lug 208 connected to the back of the bowl preferably mounted on the horizontal plate 76. A bolt 209 attaches the sheave block. The sheave 210 is mounted in this block. A bolt 211 permits the ready disassembling of the sheave. The cable has a dead end section 212 secured to a dead end clamp 213 of the sheave block assembly.

From this construction the sheave block assembly 205 on the bowl may swivel on the transverse bolt 209 as the bowl is raised and lowered in reference to the swivel beam 175. This beam may likewise swivel on the ball like bearings 185, thus giving a direct line for the cable leads between the sheaves on the swivel beam and on the bowl. A slight longitudinal movement is provided by the balls 185 being slidably mounted on the shafts 183 of the swivel beam. This takes care of any slight change of the distance apart of the neck ends of the cantilever beams due to for instance the forward end of one endless track of the tractor engaging a hump or being in a depression in the ground. The swivel action of the sheave swivel 165 takes care of any slight changes of angularity between the swivel beam 176 and the cantilever beams 100. By this arrangement it will be seen that although the bowl maintains a constant position relative to the rear end of the tractor, that the forward ends of the cantilever beams will vary their position in relation to the forward end of the tractor due to the up and down motion of one side or the other of the front part of the endless track but no matter how these positions vary, there is always a correct lead for the cable operating the bowl without any binding action. It will also be noted by this construction that the cable is led forwardly from the winch in a low position so that there is no obstruction adjacent the driver's compartment or cab of the tractor.

Various changes may be made in the details of the construction without departing from the spirit or scope of the invention as defined by the appended claims.

I claim:

1. In a bulldozer, the combination of a pair of thrust arms having a bulldozer bowl connected between the forward ends of said arms, the rear end of each arm being provided with an abutment piece, a trunnion assembly having a hub, means to attach the hub to the frame of a tractor, the hub having a terminal socket mounted for rotation on the axis of the hub and means to adjust the abutment piece vertically as to the terminal socket to thereby change the position of the thrust arms in reference to the axis of rotation of said arms and hence to the frame of the tractor, the means to adjust the abutment piece comprising interengaging teeth between the abutment piece and the terminal socket and bolts clamping the abutment piece to the terminal socket, the said teeth being arranged substantially vertical.

2. In a bulldozer the combination of a pair of cantilever beams, each beam having a thrust supporting post, said post having a portion thereof offset to one side of the place of connection to the beam and having a lower or foot portion located substantially under the center of the beam, the foot being adapted for attachment to the frame of an endless track of a tractor whereby the longitudinal center of the beam at substantially the point of connection to the thrust support is in substantially vertical alignment with the center line of the endless track of the tractor, each of the said beams having a straight vertical plane therethrough from end to end and one of said beams being constructed and adapted for a straight section of a bowl lifting cable to lie in the vertical plane of such beam.

3. In a bulldozer as claimed in claim 2, each beam having a tension supporting post adjacent its rear end with means on said post to connect to the endless track frame of the tractor in a position whereby each beam which has a substantially straight central plane intersects the endless track diagonally, the beams converging towards their forward ends.

4. In a bulldozer, the combination of a pair of cantilever beams, each having a substantially straight vertical longitudinal plane, the said planes converging at the front with the rear portion of each beam thus being spaced apart wider than the center portion, the center portion of each beam being supported on a thrust supporting post, each post having an upper horizontal portion connected to the underside of each beam and having a vertical web portion offset outwardly from the vertical plane through the beam, each thrust post having a lower or foot portion with parts thereof positioned on opposite sides of a vertical plane through the place of attachment of the beam to the post, the said lower or foot portion having means for attachment to the frame carrying an endless track of a tractor whereby the vertical center line of the beam at its point of connection to the post is substantially in the longitudinal central vertical plane of the upper and lower endless tracks of the tractor, each beam having a tension supporting post adjacent its rear end, each tension post having means for attachment to the endless track frame of the tractor, at least one of the beams being hollow and having a hollow guide structure connected thereto at the rear end of the beam for passage of an operating cable from the rear portion of the tractor forwardly through said hollow beam.

5. In a bulldozer, the combination of a pair of cantilever beams having means for support from the frame of a tractor, each beam having a sharply upturned neck adjacent its forward end, a swivel cross beam journaled at the upper portion of the upturned necks, one of the beams being hollow and having a lead of an operating cable extending therethrough, a sheave swivelly connected to the forward end of the hollow beam, the cable leading thereover, the swivel cross beam having sheaves to which the cable connects from the hollow cantilever beam, the sheaves of the swivel beam being adapted to lead the cable to a sheave operatively connected to a bulldozer bowl.

6. In a bulldozer as claimed in claim 5, each of the cantilever beams having substantially a straight upper surface leading from the rear portion of each upturned neck, the swivel sheave of the hollow cantilever beam being located substantially in alignment with the horizontal center of the cantilever beam at the place of connection of the neck to the beam whereby the main portion of the beam and the cable lead occupies a relatively low position relative to the tractor compared with the connection of the swivel cross beam to the two cantilever beams.

7. In a bulldozer, the combination of a pair of cantilever beams having means for connection and support from the frame of a tractor, each beam having a forward end with a spherical bearing, a ball mounted in each bearing, a cylindrical shaft extending through each ball and a swivel cross beam fixed'y connected to each shaft whereby the cross beam may swivel on the axis of the said shafts, also the beam with the said shafts may slide slightly through the balls and each shaft may tilt with the ball thereon in regard to the spherical bearing, the swivel cross beam having sheaves, one of the cantilever beams being hollow and having an operating cable extending therethrough, a swivel sheave connected to the hollow cantilever beam below the spherical bearing, the cable leading through the hollow beam over the swivel sheave to the sheaves of the swivel cross beam, the said cable being adapted to lead to sheaves operatively connected to a bulldozer bowl.

8. In a bulldozer, the combination of a pair of longitudinally extending cantilever beams having a tension support at the rear end of each beam and a thrust support positioned forwardly thereof, the tension and the thrust supports having means for attachment to the frame of a tractor on each side thereof, one of the beams having an opening therethrough for passage of a cable and a cable extending through said opening from a position rearwardly of the tension support to a position adjacent the forward end of the beam having the opening, such beam having a sheave at the forward end, the cable passing thereover, a pair of thrust arms pivotally mounted on the frame of the tractor and having a bowl and a connection from the part of the cable forward of the sheave to the said bowl for raising and lowering the bowl relative to the forward ends of said beams, the bowl being concave on the forward side and convex on the rear side considered in a vertical plane and having means for attaching the arms on the opposite sides of the bowl adjacent the bottom thereof, a diagonal brace rib extending upwardly from adjacent the lower side corner of the bowl on the rear side, the said brace ribs converging at the center of the bowl adjacent the upper edge and a sheave mounted on the back of the bowl substantially below the center line of convergence of the said ribs.

JAMES SAMUEL STEWART.